Patented Apr. 30, 1935

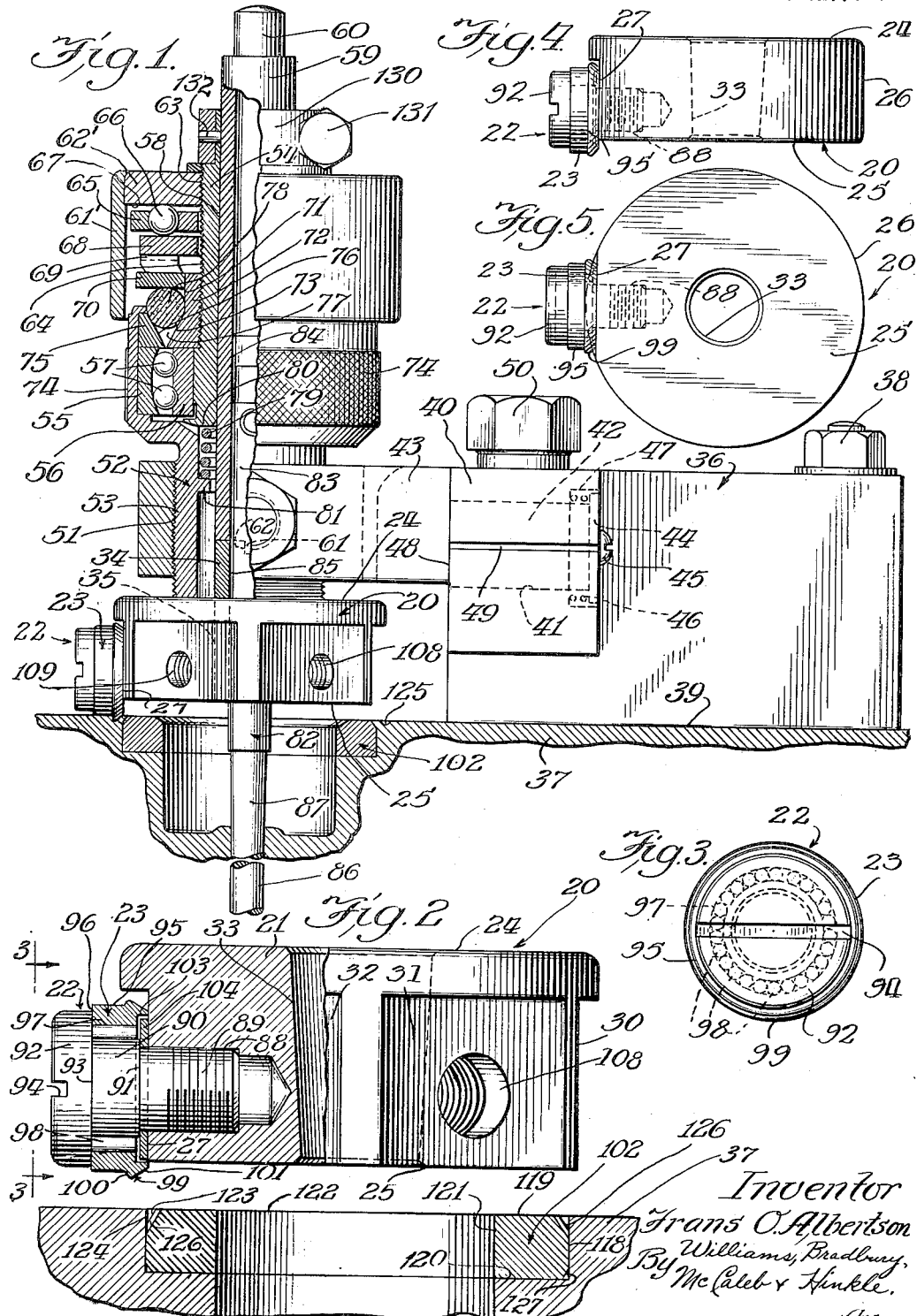

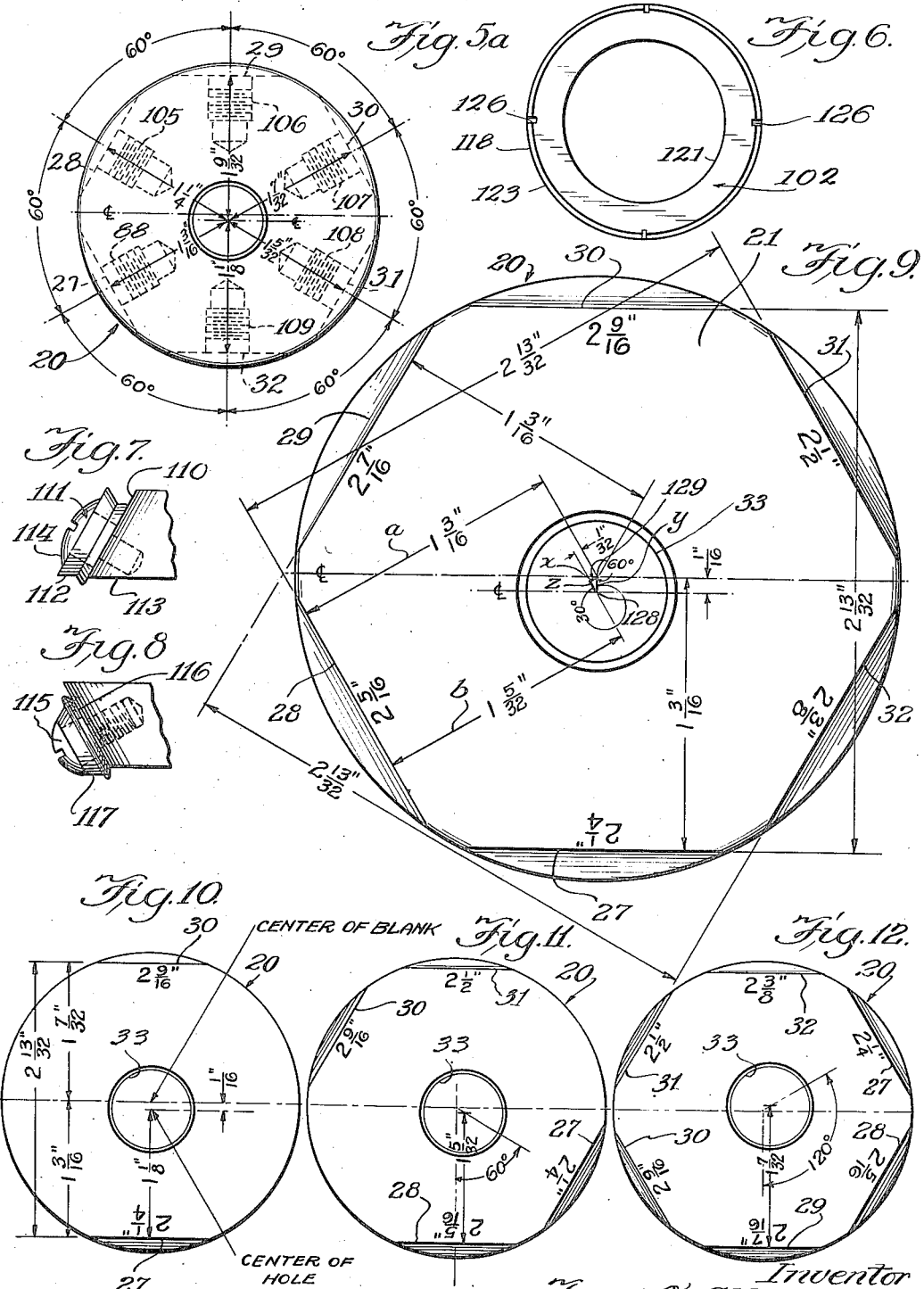

1,999,434

UNITED STATES PATENT OFFICE 1,999,434

VALVE SEAT RING SECURING TOOL

Frans O. Albertson, Sioux City, Iowa, assignor to Albertson & Company, Inc., Sioux City, Iowa, a corporation of Iowa Application March 5, 1932, Serial No. 597,082

6 Claims. (Cl. 80—1)

The present invention relates to improvements in valve seat ring securing tools and method of making the same and is particularly concerned with tools and methods used for securing new valve seats in the blocks of internal combustion engines. The tool may be used both for repairing and reconstruction of old valve seats or in the securement of special valve seats in internal combustion engines wherever it is desirable that the seat be formed of different material from the metal of the engine block itself. It should also be understood that the present tool and method are of general application and may be used for securing valve seats in place in many structures or valves other than internal combustion engines, and I do not wish to be limited to any particular use.

The improved method of reconstructing valve seats, including the present method of securing the ring seat in place, is the subject of my prior application, Serial No. 580,967, filed December 14, 1931, and the present application relates to the tool itself and to the method of making the tool.

It is often desirable to provide a valve seat in an internal combustion engine, the metal of which has better characteristics than the material of which the internal combustion engine block is constructed. The valve seats are subjected to constant impact under high pressure and at high temperatures and, although considerable attention has been given in the prior art to the provision of valves capable of withstanding this hard usage, the valve seats of the prior art have not been capable of withstanding the hard usage to which they are subjected.

In my prior applications I have described the methods of securing the valve seat ring in place by the close frictional engagement between the periphery of the ring and the wall of a recess. Contemporary methods of securing these rings in place also include the formation of under-cut recesses or otherwise and the expanding of the valve seat rings into the recess by means of special tools.

Since a valve seat ring is generally made of hard and somewhat resilient metal, it is difficult, if not absolutely impossible, to expand the ring into close engagement with the walls of the recess at the periphery of the ring. As soon as the tool is removed from the expanding engagement with the ring, the ring inevitably contracts again slightly, drawing away from the walls of the recess, and such rings are not satisfactorily secured in the engine block. Rings which are secured by endeavoring to force or expand the ring into engagement with its recess become loose and permit leakage between the ring and the engine block and are the source of a great deal of trouble.

One of the objects of the present invention is the provision of an improved valve seat ring securing tool which is adapted to secure the valve seat ring in the engine block or the like so firmly that there is no possibility of leakage between the ring and the engine block and no possibility of loosening of the valve seat ring during the use of the engine or otherwise.

Another object of the invention is the provision of an improved valve seat tool and ring structure which are adapted to effect a firm securement between the ring and the engine block so that the ring is secured against rotation as well as any other movement and so that the rings may be installed expeditiously and economically.

Another object of the invention is the provision of an improved valve seat ring securing tool of the class described, particularly adapted for use on valve seats of a predetermined size, and the provision of an improved universal tool which may be used upon a multiplicity of different valve seats of different sizes, preferably including the most common standard sizes of valve seats.

Such a universal tool necessarily greatly reduces the cost of tools for working valve seats of various sizes and brings the tools within the range of a vast number of purchasers who could not afford to purchase an individual tool for each valve seat size.

Another object of the invention is the provision of an improved method of making universal valve seat tools of the class described, which enables the various parts of the tool to be formed very quickly and expeditiously upon the usual machinery and which greatly reduces the cost of the finished universal tool.

Another object of the invention is the provision of an improved universal tool, the dimensions and proportions of which have been so arranged that it is possible to provide a ring securing tool adapted to be used on a plurality of standard valve seats without the necessity for making individual cuts in the formation of the tool to adapt each part of the tool to a particular valve seat.

Another object of the invention is the provision of an improved valve seat ring structure which is peculiarly adapted to be utilized with a valve seat ring securing tool.

Other objects and advantages of the invention will be apparent from the following description, and from the accompanying drawings, in which similar characters of reference indicate similar parts throughout the several views.

Referring to the drawings, of which there are two sheets,

Fig. 1 is an elevational view in partial section, showing the complete tool installation, including a valve seat fixture, pilot, roller tool, tool holder and automatic clutch;

Fig. 2 is an enlarged elevational view in partial section of a universal valve seat ring securing tool constructed according to the present invention, with the valve seat in enlarged section;

Fig. 3 is an end elevational view of the roller and stud alone, taken on the plane of the arrows of Fig. 2, looking from the left;

Fig. 4 is a full size elevational view of an individual ring securing tool of predetermined size;

Fig. 5 is a bottom plan view of the ring securing tool;

Fig. 5A is a top plan view of the ring securing tool;

Fig. 6 is a top plan view of a modified form of valve seat ring, shown in its complementary recess;

Fig. 7 is a fragmentary elevational view of a modified shape of tool body and roller which may be utilized where there is not sufficient room for the standard type of body and roller;

Fig. 8 is a fragmentary view of another modification, including a different form of tool body and roller;

Fig. 9 is an enlarged bottom plan view of the tool body, including the dimensions and angles for the purpose of explaining how the dimensions and proportions of the tool may be determined mathematically so that the tool may be manufactured very expeditiously, and both of the opposite flat sides of the body may be cut at the same time when this feature of the invention is employed; and Figs. 10, 11 and 12 are full sized bottom plan views of the tool body, showing its shape during the successive steps in the manufacture of the body according to the preferred method.

Referring to Fig. 2, this is an enlarged elevational view in partial section, showing the preferred form of the valve seat ring securing tool and showing the valve seat ring after it has been placed in the recess, but before it has been secured by means of the present tool. The valve seat tool, which is indicated in its entirety by the numeral 20, preferably includes a body 21 constructed of hardened metal such as steel for supporting one or more roller studs 22 which rotatably support the rollers 23.

The body 21 comprises a substantially cylindrical metal member, which may be provided with a flat upper surface 24 and a flat lower surface 25. In the case of the individual tool shown in Figs. 4 and 5 and intended to be used only on one particular size of valve seat, the periphery 26 of the tool body may be substantially cylindrical, except for the provision of a flat surface 27 at one side. In the case of the universal tool the body 21 is provided with a multiplicity of flat surfaces 27—32 located about its periphery for supporting rollers 23 at various distances from the axis of the tool in order to secure valve seat rings of different sizes.

The tool body 21 is preferably provided with a centrally located downwardly tapered bore 33 and is adapted to be secured upon a tool holder 34 by the wedging engagement of the complementary frusto-conical surface 35 of the tool holder in the tapered bore 33.

Referring to Fig. 1, the complete tool installation preferably includes the fixture 36, which may be secured to the engine block 37 by means of nuts and the usual stud bolts 38 which project from the engine block. The fixture 36 is provided with a substantially flat lower surface 39 and with a laterally projecting lug 40 having a transverse bore 41 for receiving a trunnion 42. The trunnion 42 is carried by a metal collar 43 and is mounted for rotation in the bore 41, being secured in place by a washer 44 carried by the end of the trunnion 42 and secured thereto by screw bolt 45. A compression spring 46, tensioned between the base of counterbore 47 and washer 44, urges the flat surface 48 of collar 43 into engagement with the complementary surface on the fixture 36 and tends to hold the collar in any predetermined rotative position.

The transverse lug 40 may be split at 49 and provided with a screw bolt 50 which passes through the upper part of the lug 40 and is threaded into the lower part of the lug so as to clamp the two portions together on the trunnion 42 to secure the fixture in any predetermined position.

The collar 43 has a vertically extending threaded bore 51 which is adapted to receive the adjustable feed screw 52 which is provided with a complementary threaded surface 53. The guide 54 of the feed screw is supported for universal movement with respect to the feed screw by means of the races 55, 56 and ball bearings 57. The guide 54 is provided with a cylindrical bore 58 for slidably receiving a tool shaft 59 having a non-circular upper end 60. The lower end of the tool shaft 59 is provided with a downwardly projecting rib 61, which is adapted to engage in a complementary groove 62 formed in the upper end of a tool holder 34. The tool holder 34 may thus be joined to the drive shaft 59 by the spline connection provided between the rib 61 and groove 62 in such a manner as to provide a limited universal joint at a point very close to the body of the tool 20.

The driving mechanism preferably includes a casing 61', the upper end 62' of which is provided with a threaded bore 63 engaging the threaded outer surface 64 of the guide 54. Within the casing 61' there is located a race 65 including a multiplicity of ball bearings 66, the upper side of which engages the lower flat surface 67 of the end wall 62'.

The ball bearings 66 also engage the lower annular race 68, which in turn engages a spring 69, the spring engaging an annular clutch member 70. The clutch member 70 is slidably supported upon the cylindrical portion 71 of the collar 72, which is also provided with a frusto-conical surface 73. The screw casing 74 includes a clutch ring 75 fixedly supported therein and provided with a frusto-conical surface 76. The frusto-conical surfaces 73 and 76 form an annular V groove 77 adapted to receive a leather clutch ring 78.

The compression spring 70 urges the guide 54 upward and takes up the backlash between the guide 54 and the screw 52. Compression spring 79 is compressed between the end 80 of the guide 54 and an annular flange 81 in the screw 52.

The installation preferably includes a valve stem pilot 82, which is provided with an upper cylindrical portion 83 which is adapted to be received in the cylindrical bore 84 in the drive shaft 59. The cylindrical portion 83 of the pilot stem 82 also passes through the cylindrical bore 85 in the tool holder 34. The pilot stem is also preferably provided with a lower cylindrical portion 86 which accurately fits the valve stem guide and with a frusto-conical portion 87 which is so gradually tapered that it may be wedged into the upper part of the valve stem guide to secure the pilot in fixed position in the guide merely by this wedging engagement.

Referring again to Fig. 2, each of the flat surfaces 27 to 32 of the tool body 21 is preferably provided with a centrally located threaded bore 88. The threaded bore 88 is adapted to receive the complementary threaded end 89 of the roller stud 22.

The roller stud 22 is preferably formed with an enlarged cylindrical bearing portion 90 and an annular shoulder 91 for definitely determining the position of the roller stud in the body 21. The roller stud 22 is also provided with a head 92 having a lower flat surface 93 adapted to act as a thrust bearing for the roller 23. The head 92 may be non-circular, or it may be provided with a slot 94 for receiving a screw driver in securing the stud in place.

The roller 23 comprises a substantially cylindrical metal member in the embodiment of Fig. 2, which is provided with an externally cylindrical surface 95 and a substantially flat end 96 engaging the annular shoulder 93 of the head 92. The roller 23 is provided with an inner cylindrical surface 97 or a cylindrical bore of sufficient size so that a plurality of roller bearings 98 may be interposed between the inner cylindrical surface 97 and the cylindrical surface 90 of the stud 22. The roller bearings 98 and the roller 23 are, of course, constructed of the best hardened and tempered tool steel, accurately machined to shape. At its inner end the roller 23 is preferably provided with a radially projecting rib 99, one side of which is formed with a surface 100, which may be of abrupt slope or at substantially right angles to the axis of the roller 23. The other side 101 of the rib 99 is preferably gradually tapered, as shown in Fig. 2, in such a manner that the rib 99 is adapted to spin or force the metal of the engine block 37 over and above the valve seat ring 102, as shown in Fig. 1.

The roller 23 is preferably formed with a counterbore 103 for receiving a washer 104 which may be clamped between the annular shoulder 91 and the flat surface 27. The thickness of the washer 104 may be used to determine the relative play between the roller 23 and the roller stud 22, and the washer 104 may retain the roller bearings 98 in place on the stud 22.

The substantially cylindrical surface 95 on the roller 23 is adapted to come into engagement with the engine block 37 as soon as the rib 99 has been worked into the engine block to a predetermined depth. The cylindrical surface 95 on roller 23 thus constitutes a stop surface for predetermining the depth of groove which will be formed by the rib 99 and for determining when the operation of securing the valve seat ring has been completed.

Referring to Figs. 4 and 5, the rollers and studs utilized in this individual tool are substantially the same as that described with respect to Fig. 2.

The stud 22 with its roller 23 and washer 104 may be removed from the threaded bore 88 in the flat surface 27 and located in any one of the other threaded bores 105—109 which are provided in the flat surfaces 28—32 of the tool body 21. The washer 104 may have a close frictional fit upon the end 89 of the stud 92 so that the stud and roller constitutes a complete unit which will not become disassembled when the stud is removed from the tool body. It would, of course, be impossible to utilize more than one roller at the same time, since the flat surfaces 27—32 are located at different radii from the axis of the tool and the other rollers would interfere with the use of the particular roller which it was desired to use.

The present tool is made capable of universal use on valve seats of a plurality of predetermined sizes by the provision of a multiplicity of positions for the same stud and roller. If desired, additional studs and rollers of different sizes and proportions may be provided with the same tool for accomplishing various different results.

Referring to Figs. 7 and 8, these are two modified forms of tool bodies which may be utilized where there is not sufficient room for bodies of the type shown in Fig. 2. In the tool of Fig. 7, the flat surface 110 is not parallel to the axis of the tool, but slopes toward the axis at its upper end. This disposes the axis of the stud 111 at an angle to the axis of the tool which is not a right angle. The head of the stud 111 may be made smaller, as shown in Fig. 7, and the roller may have its external cylindrical stop surface 112 made frusto-conical in form. The angularity of the frusto-conical surface 112 is such that the lower edge of the surface 112 has its element substantially parallel to the flat surface 113 of the bottom of the tool or parallel to the surface of the engine block. This tool would be very convenient where there is a very limited space at the point 114 surrounding the valve seat.

Referring to Fig. 8, in this embodiment the right end of the stud 115 has been tilted upward, and the flat surface 116 slopes downward. The frusto-conical stop surface 117 in this embodiment is also arranged with the element which engages the engine block substantially parallel to the upper surface of the engine block.

In each one of the different embodiments of rollers described, it will be noted that there is a rib which is adapted to work the metal out of the engine block over above the valve seat ring, but after the rib has reached a predetermined depth there is a curved stop surface on the roller which prevents the roller from being pressed into a greater depth.

Referring again to Fig. 2, the valve seat ring 102 is preferably constructed of the best alloy steel adapted to be used for withstanding the hard usage to which a valve seat is subjected.

The valve seat ring 102 may be suitably worked, tempered and hardened, and otherwise treated for this purpose. It is preferably a ring with a substantially cylindrical outer surface 118, a flat upper surface 119, a flat lower surface 120, and a cylindrical inner surface 121. The upper inner corner 122 may be as shown, or it may be already provided with a predetermined frusto-conical valve seat formation. In order to make rings of a single size suitable for work on engines having various different valves, I prefer to leave the formation of the actual valve seat surface until the ring is secured in place, when the valve seat may be made of any angularity which is utilized in that particular engine.

The valve seat ring 102 is preferably formed with a frusto-conical or chamfered surface 123 at its upper outer corner for the purpose of forming a space 124 into which the metal of the engine block 37 may be forced.

Referring to Fig. 1, it will be noted that when the operation is finished the groove 124 is filled with the metal of the engine block which extends over the top of the ring, and a groove 125 is left in the engine block.

The valve seat ring is also preferably formed with a plurality of transversely extending slots 126, which may be located at regularly spaced points about its periphery on the chamfered surface 123. The slots 126 are very quickly filled with the metal which is forced over by the rib 99, and thus the ring 102 is immediately secured against rotation by the engagement of the parts of the engine block with the opposite sides of the slots 126. The continuation of the securing process by means of the tool eventually fills the slots 126 and firmly secures the ring in place by the overhanging portion of metal which is spun over from the engine block.

The valve seat ring is also preferably provided with a chamfered surface 127 at its lower outer corner for the following purpose: The recess for the valve seat ring is cut by means of a tool which has a pair of sharpened edges extending at right angles to each other. The maximum amount of wear occurs on this tool at the apex of these two sharpened edges and naturally the apex or corners of the blade wears down most quickly. It is very difficult, if not a physical impossibility, to cut the valve ring recess with a sharply defined lower corner. Thus great difficulty would be encountered in seating valve seat rings 102 if the lower corner at the point 127 were of right angular shape.

The provision of the chamfer 127 takes care of the tendency of the cutting tool to form a recess which does not have a sharp outer and lower corner and permits the seating of the valve seat ring firmly against the bottom of the recess. The valve seat ring has its periphery in close frictional engagement with the wall of the recess and the bottom of the ring engages the bottom of the recess. When a valve seat ring is secured according to the present method their is no possibility of the ring working loose under any conditions of service, and there is no possibility of leakage between the ring and the engine block, on account of the close engagement between the parts of the ring and the block and the overhanging portion of the motor block.

Referring to Figs. 9 to 12, these are diagrammatic views showing the bottom of the tool body in various stages of its manufacture for the purpose of explaining the preferred method of constructing the tool. The various sizes which have been selected for standard valve seat ring sizes are merely exemplary of one set of proportions which may be used. These sizes will take care of most of the modern internal combustion engines used upon automobiles. For example, the sizes used for one ring securing tool are one and seven-eighths, one and thirteen-sixteenths, one and fifteen-sixteenths, two and one-sixteenth, two and one-eighth and two inches.

In the embodiment selected to illustrate the invention the ring sizes which would be stamped upon the lower face of the ring securing tool, as shown in Fig. 9, are two and one-fourth, two and five-eighths, two and seven-sixteenths, two and nine-sixteenths, two and one-half and two and three-eighths.

These sizes correspond substantially to the external diameter of the ring to be secured and the radius extending from any predetermined flat face to the center of the tool is one-half of the size stamped adjacent that flat surface. Thus the flat side which is used to support the stud and roller, when operating with a two and one fourth inch ring, is one and one eighth or one and four sixteenths inches from the center of the tool.

The flat surfaces 27—32 respectively are preferably arranged at angles of sixty degrees to each other for the reason that it is possible with this predetermined angularity to manufacture the tool body according to an improved method which has distinct advantages from the point of view of saving of time and labor.

In the embodiment illustrated in Fig. 9, the distance between the opposed flat surfaces 27 and 30, 28 and 31, 29 and 32 is equal in every case to two and thirteen thirty-seconds inches. This makes it possible to straddle-mill the flat surfaces two at a time, and the formation of the surfaces may be made without the necessity for adjusting cutters in any way and by merely turning a tool body blank through an angle of sixty degrees to bring it into position for the next cut.

In order to accomplish this result the tool body blank 21 is preferably supported upon an eccentric arbor which is carried by the usual dividing head. The dividing head is so arranged that by rotating its crank the tool blank 21 may be brought into any of a plurality of rotative positions at an angular displacement of sixty degrees from each other by the use of the dividing head.

Since it is desired to provide flat surfaces located at varying radii, differing by an amount of one thirty-second of an inch from each other, the axis of the eccentric portion of the arbor should preferably be two thirty-seconds or one sixteenth of an inch from the true center of the axis of the dividing head and of the bore 33.

Referring to Fig. 9, the true center of the bore 33 and body 21 is indicated by the numeral 128. The eccentric center about which the body 21 is rotated during its manufacture is one sixteenth of an inch higher up and is indicated by the numeral 129, although the flat surface 27 is one and one eighth or one and two sixteenths inches from the true center 128. It would, therefore, be one and two sixteenths plus one sixteenth, or one and three sixteenths inches from the eccentric center 129. The opposite flat surface 30 is one and nine thirty-seconds from the true center 128, or one and seven thirty-seconds from the eccentric center 129.

Referring to Fig. 10, the blank is first secured in proper position on the eccentric arbor of the dividing head and the opposed surfaces 27 and 30 are formed by straddle-milling these two surfaces at the same time, with the milling cutters disposed two and thirteen thirty-seconds inches apart.

The blank is then rotated counterclockwise from the position of Fig. 10 to that of Fig. 11 through an arc of sixty degrees, and the eccentric mounting of the blank will displace the blank with respect to the milling cutters in such a manner as to locate them for the formation of the flat surfaces 28 and 31 the same distance apart but at different radii from the true center of the blank.

The flat surface 28 is intended to be used with two and five-sixteenths inch rings, and should therefore be at a radius of one and five thirty-seconds inches from the true center. The blank is, however, being rotated upon the center 129, which is one and three-sixteenths inches from the cutter, which will form the surface 28. When the blank is rotated on this eccentric center 129 through an angle of sixty degrees, it will be noted that the true center will move into a position closer to the cutter which is adjacent the side 28.

Referring to Fig. 9, the difference in distances between the flat side 28 and the true center and the flat side 28 and the eccentric center is shown by the dimension lines A and B. The small triangle shown at the center of this diagram has a hypotenuse of one-sixteenth of an inch, and the short side, which represents the difference between the radii and the surface 28, is equal to one-thirty-second of an inch. This is true because the sine of thirty degrees is equal to one-half.

This relation is easily proved by reference to the usual trigonometric formula. The sides of the small triangle may be designated by the letters X, Y and Z.

$$\frac{X}{Y} = \text{cosine } 60° = \text{sine } 30° = \frac{1}{2}. \quad Y = \frac{1}{16}. \quad X = \frac{1}{2}$$
$$\text{times } \frac{1}{16} = \frac{1}{32}.$$

The flat surface 28 will, therefore, be at a distance of one and three-sixteenths less one-thirty-second or one and five-thirty-second inches from the true center. The side 31 will be one and eight-thirty-seconds from the true center.

It will thus be observed that the rotation of sixty degrees of the blank on an eccentric axis shortens the radius to the flat surface 28 by one-thirty-second of an inch and increases the radius to the flat surface 31 by one-thirty-second of an inch.

Referring to Fig. 12, this is a diagrammatic view showing the third step in the manufacture during which the sides 29 and 32 are formed. The rotation of the blank sixty degrees further counterclockwise for this operation causes the surface 29 to be formed at a radius of one and seven-thirty-seconds inches and the surface 32 to be formed at a radius of one and sixty-thirty-seconds from the true center.

By adding together the respective distances or radii of the opposite flat surfaces from the true center, it will be observed that the opposite flat surfaces are always the same distance apart and that by the use of an eccentric axis for rotation of the blank during the manufacture, the radii of the respective supporting surfaces for the rollers may be varied as desired. By rotating the blank through angles of sixty degrees and using an eccentricity which is twice the variation in radius desired, the proportions may be made such that the flat surfaces may be straddle-milled on opposite sides at the same time without any adjustment of the cutters.

It is thus possible to manufacture the universal tool of the type shown in Figs. 2, 4 and 9 very expeditiously at a very low cost, and the dimensions and proportions 12 of the parts of the tool as described are a very important feature of the invention.

The tool may be constructed at a greater cost by forming each of the flat surfaces separately at a predetermined radius, but the device may be produced in large quantities very economically by the use of the improved method. In brief, therefore, the improved method of making the tool comprises the formation of a blank, the support of the blank upon an eccentric axis, the simultaneous cutting of flat surfaces on the opposite sides of the blank, the rotation of the blank through an angle of sixty degrees on an eccentric axis, the eccentricity of which is equal to twice the variation in radius desired, the formation of additional flat surfaces simultaneously on opposite sides with the blank in this position, etc. The flat surfaces are provided with bores for supporting the rollers at predetermined radii from the true center, and it is thus possible to provide a universal tool at a fraction of the cost which would be involved if it were necessary to form each of the flat surfaces separately at a different radius with a different adjustment.

The operation of the complete tool assembly shown in Fig. 1 is as follows: The guide 54 is clamped to the drive shaft 59 by means of a clamp 130 having a screw bolt 131 and a transverse pin 132. When power is applied to the drive shaft 59 at its end 60 the drive shaft 59 is rotated, rotating with it the tool holder 34 and the tool 20.

The rotation of the drive shaft 59 carries with it through the clamp 130 the guide 54 and clutch collar 72 which engages one side of leather clutch ring 78. The leather clutch ring 78 is forced into the groove 77 by the pressure ring 70 and the amount of pressure may be regulated by screwing the casing 61' downward on the threaded portion 63 of guide 54. The leather clutch ring 78 tends to carry with it the outer clutch ring 75, causing the screw 52 to rotate with the drive shaft 59. However, there is slippage between the clutch collar 72, clutch ring 78 and outer clutch ring 75, depending upon the pressure placed upon the leather ring, and therefore the screw 52 is rotated at a much slower rate than the drive shaft 59, depending upon the pressure placed on the clutch and the resistance which the tool encounters.

The end of the feed screw 52 engages the top of the tool 20 and causes the ridge 99 on the roller 23 to be forced into the metal of the engine block 37. The metal of the engine block is spun or forced over into the groove 124 above the valve seat ring 102, and this operation is continued as the tool is fed downward until the cylindrical surface 95 comes into engagement with the engine block. The increased resistance to the feeding, which is caused by the contact of the stop surface 95 with the engine block, causes the clutch to slip and, although the drive shaft still rotates the tool, the tool is not fed toward the engine block, and the cessation of the feeding operation indicates to the operator that the ring is secured in place. Successive rings can be secured in place in the same way by means of the present tool installation, and the clutch may be so adjusted that the rings are uniformly secured in place.

It will thus be observed that I have invented an improved valve seat ring securing tool and a tool installation by means of which valve seat rings may be more uniformly secured in place than is possible with the devices of the prior art. The present valve seat ring securing tool is capable of economical manufacture, and may be provided in the universal form so that it is capable of taking care of valve seat rings of various different sizes.

The valve seat rings which are secured with the present tool are so firmly secured that there is no possibility of the rings becoming loose nor any possibility of leakage between the ring and the engine block. As distinguished from devices and methods which purport to expand the ring, the present tool works upon the metal of the engine block, which is of such character that it is capable of being worked into position without springing back, as would be the case where an effort was made to expand the ring into the recess in the block.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A valve seat ring securing tool comprising a metal body formed with a tapered bore adapted to receive a tool holder, said body being provided with a flat surface having a transverse threaded bore, a trunnion having a threaded end secured in said threaded bore and having a head and a roller carried by said trunnion and projecting below the body of said tool, said roller having a ridge adapted to engage an engine block and force the metal of the block into engagement with a valve seat ring, said roller having a substantially cylindrical stop surface outside said ridge for engaging the engine block and predetermining the depth of movement of said ridge.

2. In a ring securing tool for valve seats of internal combustion engines, the combination of a supporting fixture with a feed screw adjustably mounted on said fixture, a guide carried by said feed screw and having a circular bore extending through the same, a drive shaft having an axial bore and rotatably and slidably mounted with respect to said feed screw, a pilot stem carried by the internal combustion engine block and slidably engaging in a bore in said drive shaft, a valve seat tool having a roller for engaging the metal of the engine block said drive shaft being rotatably and slidably mounted on said pilot stem and supporting said valve seat tool, and a universal connection between said fixture and said drive shaft.

3. In a ring securing tool for valve seats of internal combustion engines, the combination of a supporting fixture with a feed screw adjustably mounted on said fixture, a guide carried by said feed screw and having a circular bore extending through the same, a drive shaft rotatably and slidably mounted with respect to said feed screw, a pilot stem carried by the internal combustion engine block and slidably engaging in a bore in said drive shaft, a valve seat tool, said drive shaft being rotatably and slidably mounted on said pilot stem and supporting said valve seat tool, and a universal connection between said fixture and said drive shaft, said tool comprising a supporting body, a stud carried by said body at a predetermined radius from the axis of said pilot stem, and a roller carried by said stud adapted to force the metal of the engine block into engagement with the valve seat ring.

4. A valve seat ring securing tool comprising a substantially cylindrical body formed with a flat surface on its periphery, said body having an axially extending tapered bore, a transversely extending stud carried by said body and projecting from said flat surface, a roller carried by said stud, said roller having a stop surface and having a radially projecting ridge adapted to force the metal of an engine block into engagement with a valve seat ring, a tool holder having a tapered surface for wedging engagement with the axial bore in said tool, a pilot stem fixedly carried by an engine block for supporting said tool holder for rotation and reciprocation, said tool holders having an axial bore for slidably receiving said pilot stem, and means for supporting said tool holder for universal movement, located adjacent the upper surface of said tool.

5. A valve seat ring securing tool comprising a substantially cylindrical body formed with a flat surface on its periphery, said body having an axially extending tapered bore, a transversely extending stud carried by said body and projecting from said flat surface, a roller carried by said stud, said roller having a stop surface and having a radially projecting ridge adapted to force the metal of an engine block into engagement with a valve seat ring, a tool holder having a tapered surface for wedging engagement with the axial bore in said tool, a pilot stem fixedly carried by an engine block for supporting said tool holder for rotation and reciprocation, said tool holder having an axial bore for slidably receiving said pilot stem, said drive shaft having a universal support adjacent the upper surface of said tool, comprising a tool supporting fixture adapted to be fixedly secured to an engine block and having a guide for resisting lateral thrust on said drive shaft by virtue of the eccentric location of said roller.

6. A valve seat ring securing tool comprising a supporting body adapted to be secured on a tool holder, said supporting body having a thrust surface formed at one side at a predetermined radius from the center of said body, a stud carried by said body and located in said thrust surface, and a roller rotatably mounted on said stud, said roller having a spinning formation comprising a rib adapted to force the metal of an engine block over a valve seat ring and into engagement with the valve seat ring when said body is rotated and fed toward the engine block, said roller also having a substantially cylindrical surface engaging the engine block and predetermining the depth to which said rib moves into said engine block, said rib being located on the side toward said body, and said cylindrical surface on the side away from said body.

FRANS O. ALBERTSON.